US011194871B2

(12) United States Patent
Dalal et al.

(10) Patent No.: US 11,194,871 B2
(45) Date of Patent: Dec. 7, 2021

(54) DATA ENRICHMENT SYSTEMS AND METHODS FOR ABBREVIATED DOMAIN NAME CLASSIFICATION

(71) Applicant: Proofpoint, Inc., Sunnyvale, CA (US)

(72) Inventors: Gaurav Mitesh Dalal, Fremont, CA (US); Ali Mesdaq, San Jose, CA (US); Hung-Jen Chang, Fremont, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 304 days.

(21) Appl. No.: 16/370,323

(22) Filed: Mar. 29, 2019

(65) Prior Publication Data

US 2021/0042371 A1 Feb. 11, 2021

(51) Int. Cl.
*G06F 16/953* (2019.01)
*G06F 16/28* (2019.01)

(52) U.S. Cl.
CPC .......... *G06F 16/953* (2019.01); *G06F 16/285* (2019.01); *G06F 16/288* (2019.01)

(58) Field of Classification Search
CPC ..... G06F 16/953; G06F 16/285; G06F 16/288
See application file for complete search history.

(56) References Cited

U.S. PATENT DOCUMENTS

| 9,762,612 B1 | 9/2017 | Schiffman |
| 10,380,248 B1* | 8/2019 | Lai ...................... G06F 16/9535 |
| 2004/0220903 A1 | 11/2004 | Shah |
| 2009/0210417 A1 | 8/2009 | Bennett |
| 2017/0295187 A1* | 10/2017 | Havelka .............. H04L 63/1441 |

OTHER PUBLICATIONS

Extended European Search Report in Application No. 20162450.9 dated Jul. 2, 2020, 8 pgs.
Kahn, Tamara, "Trademarks Take a Ride on the Cyber Highway," Intellectual Property Law Bulletin, USF Intellectual Property Law Assn, San Francisco, CA, Spring 1996, Jan. 1, 1996, pp. 10-11.

* cited by examiner

*Primary Examiner* — Kannan Shanmugasundaram
(74) *Attorney, Agent, or Firm* — Sprinkle IP Law Group

(57) ABSTRACT

To find enriching contextual information for an abbreviated domain name, a data enrichment engine can comb through web content source code corresponding to the abbreviated domain name. From textual content in the web content source code, the data enrichment engine can identify words with initial characters that match characters of the abbreviated domain name to thereby establish a relationship therebetween. This relationship can facilitate more accurate and efficient domain name classification. The data enrichment engine can query a WHOIS server to find out if candidate domains having initial characters that match the characters of the abbreviated domain name are registered to the same entity. If so, keywords can be extracted from the candidate domains and used to find more relevant domains for domain risk analysis and detection. Candidate domains determined by the data enrichment engine can be provided to a downstream computing facility such as a domain filter.

20 Claims, 7 Drawing Sheets

DATA ENRICHMENT SYSTEMS AND METHODS FOR ABBREVIATED DOMAIN NAME CLASSIFICATION

TECHNICAL FIELD

This disclosure relates generally to the field of digital risk detection. More particularly, this disclosure relates to data enrichment systems and methods useful for finding candidate domains relating to abbreviated domain names for digital risk analysis and detection.

BACKGROUND OF THE RELATED ART

Today, domain names are widely used to establish a unique identity. For example, organizations may choose a domain name that corresponds to their name (or brand), helping Internet users to reach them easily. Such a domain name can correspond to or otherwise represent a brand name, trademark, term, design, symbol, or other feature that distinguishes an entity (e.g., organization, product, etc.) from its rivals or competitors in the eyes of others (e.g., consumers).

In some cases, a domain name may be an abbreviated, acronym, or otherwise shortened name of a brand or entity. An abbreviated domain name may be formed from the initial components in a phrase or a word. There is no universal standardization of the various names for abbreviations and of their orthographic styling. This means that a few characters in an abbreviated domain name can potentially represent many different combinations of words, hyphens, numbers, and/or letters in one or more languages. This kind of freestyle association can make it difficult to find domain names that maybe relevant to a domain of interest (e.g., domains that are owned by the same brand or entity) and/or domain names that maybe spoofing a domain of interest (e.g., suspicious domains that may confuse end users and/or profit from the goodwill of a certain domain, brand, or trademark belonging to someone else). The limited number of characters in an abbreviated domain name also makes it difficult to derive meaning. In view of these and other challenges, there is room for technical innovations and improvements in domain name processing for digital risk analysis and detection.

SUMMARY

To confuse end users and/or profit from the goodwill of a certain domain, brand, or trademark belonging to someone else, attackers may try to register domain names that are similar to that certain brand, domain, or trademark. Those domain names may often contain the name of the brand or a word similar to the brand name. As described above, an abbreviation can potentially be associated with multiple combinations of words, hyphens, numbers, and/or letters in English and/or other languages. This makes a domain with an abbreviated name an easy target for such attacks. Because an abbreviated domain name can provide very little, if any, contextual information on what it actually represents, it can be extremely difficult to find relevant and/or spoofed domains.

Embodiments disclosed herein provide data enrichment systems and methods that can find domain names that maybe relevant to and/or spoofing a domain of interest (e.g., a seed domain). In some embodiments, a data enrichment method for abbreviated domain name processing can include receiving, through a user interface by a computer operating a data enrichment engine, an abbreviated domain name; obtaining, by the data enrichment engine, web content source code corresponding to the abbreviated domain name; extracting, by the data enrichment engine, textual content from the web content source code corresponding to the abbreviated domain name; determining, by the data enrichment engine from the textual content, a set of words with initial characters that match characters of the abbreviated domain name to thereby establish a relationship between the set of words and the abbreviated domain name; recording, by the data enrichment engine, the relationship between the set of words and the abbreviated domain name; determining, by the data enrichment engine, whether a candidate domain name of the set of words and the abbreviated domain name are owned by same entity, the determining comprising querying a WHOIS server with the set of words and comparing a result returned by the WHOIS server with information associated with the entity; and providing, by the data enrichment engine, the candidate domain name to a downstream computing facility for domain name classification.

In some embodiments, the characters of the abbreviated domain name can include a letter, a number, a hyphen, or a combination thereof in one or more languages.

In some embodiments, determining the set of words can include capturing a number of consecutive words from the textual content and comparing an initial character from each of the number of consecutive words with the characters of the abbreviated domain name. After stripping out HyperText Markup Language (HTML) elements (which are created using tags) from the web content source code, the data enrichment engine gets a text string of all the textual content in the web content source code. The order of words in the textual content is not changed or modified. The data enrichment engine is operable to process, a predetermined number (which is determined based on the number of characters in an input abbreviated domain) of consecutive words at a time, the entire text string. During this processing, the data enrichment engine is operable to remove consecutive words from the textual content that have initial characters arranged in an order that is different from that of the characters of the abbreviated domain name. Further, the data enrichment engine is operable to count each occurrence of a set of words having the same initial characters that match the characters of the abbreviated domain name. The set of words having the highest frequency of occurrences in the textual content can be selected as the candidate domain name.

There can be many uses of the candidate domain name determined by the data enrichment engine. For example, responsive to the candidate domain name of the set of words and the abbreviated domain name being owned by same entity, keywords can be extracted from the candidate domain name and used to query the WHOIS server to find more new domain names.

The data enrichment engine can also query the WHOIS server about the abbreviated domain name and use the domain name registration information for the abbreviated domain name to find more new domain names. If the abbreviated domain name is not privately registered, a reverse lookup procedure can be performed to iteratively query the WHOIS server for additional domain names registered to the same entity until no more brand-registered domain names could be found.

One embodiment may comprise a system having a processor and a memory and configured to implement the method disclosed herein. One embodiment may comprise a computer program product that comprises a non-transitory computer-readable storage medium which stores computer instructions that are executable by a processor to perform the method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Currently, there are hundreds of millions of domains on the Internet. Whenever there is a need to process (e.g., classify, categorized, etc.) domains on the Internet, a huge cost in time and money is needed to process all of them. This huge task is made even more complicated by the presence of abbreviated domain names. This is because, as discussed above, abbreviated domain names can correspond to many possible combinations of words, numbers, hyphens, letters, etc. in one or more languages. This makes it difficult to find brand violations and suspicious domain names.

For example, it is very difficult to classify: gia.edu, msu.edu, mlb.com, aep.com, va.gov, fbi.gov, given just their abbreviated domain names. Using the current Domain Name Discovery and Protection technology, available from Proofpoint, Inc., headquartered in Sunnyvale, Calif., it is possible to find the Levenshtein distance (a string metric for measuring the difference between two sequences) of abbreviated domain names successfully, along with some social engineering attacks. However, due at least to the number of possible matches, it is very difficult to accurately and quickly detect relevant domains based on a full expansion of abbreviated words solely from the characters in the abbreviated domain names.

Further, abbreviated domain names provide very little context, if any. This makes it difficult to derive meanings from abbreviated domain names and find relevant and/or spoofed domains based on meanings. For example, it is very hard to derive meaning from the abbreviated domain name "aep.com" that has just three letters. The inability to derive meaning from a domain of interest (which is referred to herein as a "seed domain") can contribute to the rate of false-positives. For example, it is possible to filter domains on the Internet that are close to a seed domain in terms of Levenshtein distance. Thus, a candidate domain "ciia.com" could be found to be similar to a seed domain "cia.com." However, in this example, "ciia.com" is falsely identified because the content on this site is not relevant to the seed domain.

Figure 1:
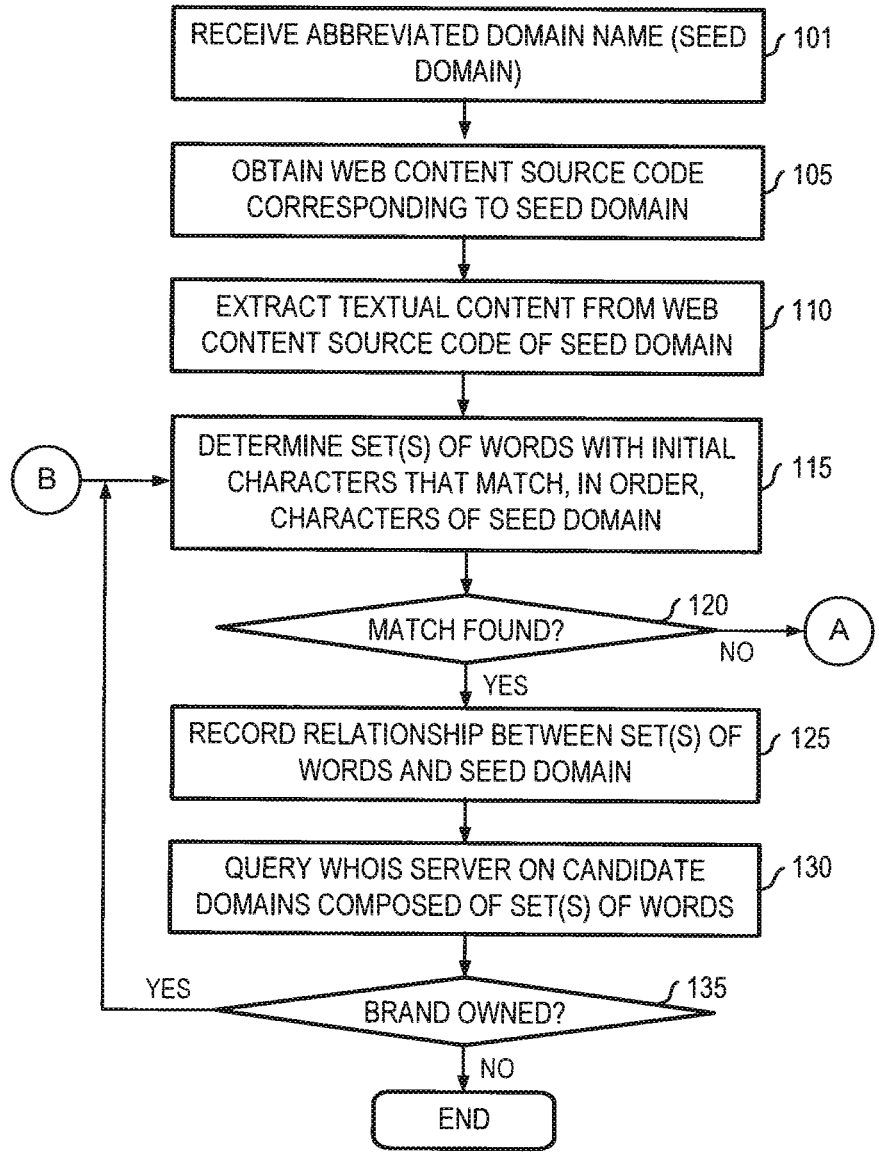
FIG. 1 is a flow chart illustrating a data enrichment method for abbreviated domain name processing according to some embodiments.
Figure 3:
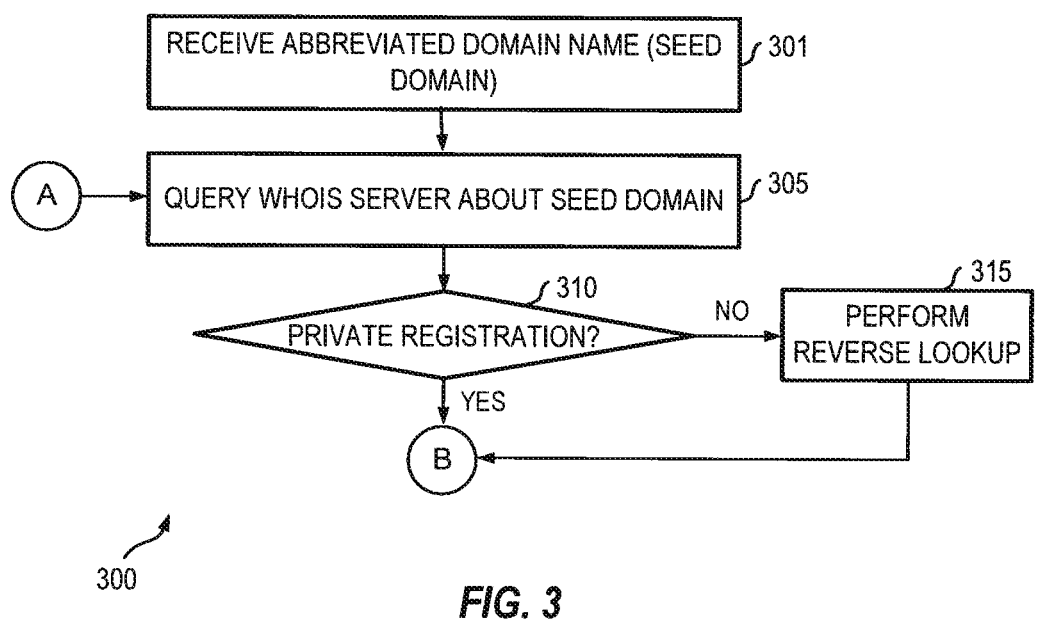
FIG. 3 is a flow chart illustrating a data enrichment method for abbreviated domain name processing that can be performed in conjunction with the method of FIG. 1 according to some embodiments.

To this end, embodiments disclosed herein provide data enrichment systems and methods that, given an abbreviated domain name, can identify candidate domains that may or may not be owned by the same entity. Generally, a goal is to build contextual information around abbreviated domain names using multiple data enrichment methods. One method is directed to downloading textual content that is present on the site corresponding to an abbreviated domain name and extracting important key words related to the abbreviated domain name. This is illustrated in FIG. 1. Another method is directed to extracting keywords from brand-owned domain names. For instance, using WHOIS information of an abbreviated domain name, a reverse-lookup can be performed to find additional domain names registered to the same entity that owns the abbreviated domain name. Keyboards from these domain names can then be extracted and associated with the abbreviated domain name. This is illustrated in FIG. 3. These methods can establish relationships among domain names on the Internet and an abbreviated domain name, making it easier and more efficient to find relevant and/or spoofed domains and reducing false-positives.

Referring to FIG. 1, in some embodiments, method 100 may include receiving, through a user interface by a computer operating a data enrichment engine, an abbreviated domain name (101). An example of user interface 200 is illustrated in FIG. 2.

Figure 2:
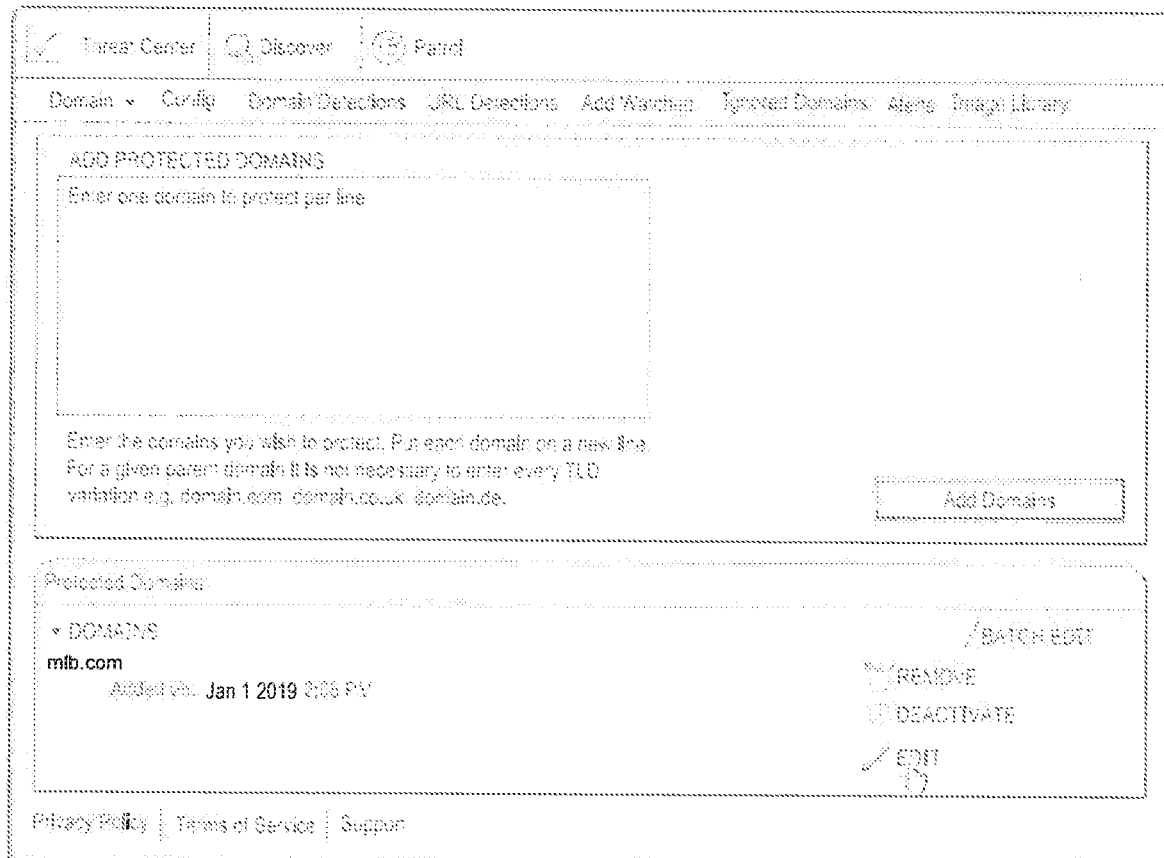
FIG. 2 depicts a diagrammatic representation of a user interface for entry of an abbreviated domain name according to some embodiments.
Figure 4:
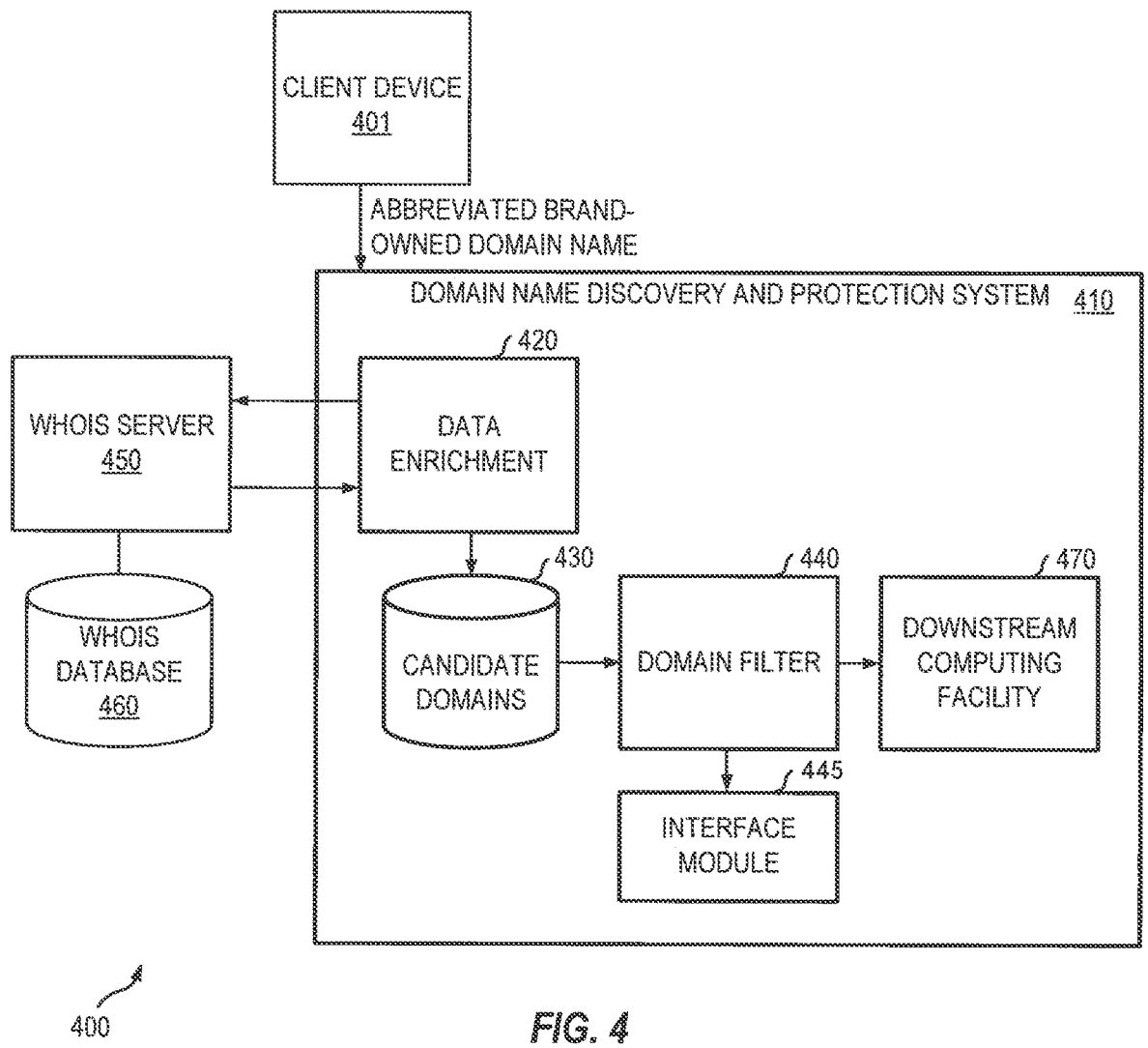
FIG. 4 depicts a diagrammatic representation of a network computing environment where embodiments disclosed herein can be implemented.

As shown in FIG. 2, an administrator or authorized user of an entity may access user interface 200 to provide an abbreviated name of a domain owned by the entity to a domain name discovery and protection system (e.g., system 410 shown in FIG. 4). The characters of the abbreviated domain name can include a letter, a number, a hyphen, or a combination thereof in one or more languages. In response, a data enrichment engine (e.g., data enrichment engine 420 shown in FIG. 4) is operable to obtain web content source code corresponding to the abbreviated domain name (105).

A domain name is a label that identifies a network domain. This label indicates the ownership or control of an Internet Protocol (IP) resource, such as a computer used to access the Internet, a server computer hosting a web site, the web site itself, or any other service communicated via the Internet. In this case, the abbreviated domain name indicates a web site, or, more specifically, a web page of the web site, owned by the entity. Accordingly, in one embodiment, web content source code may also be referred to as page source code.

A web page is a document that servers as a web resource, typically identified using Uniform Resource Identifiers, on the World Wide Web. This document is a computer file, usually in hypertext written in HTML or a suitable markup language. HTML elements are the building blocks of HTML documents. This means that HTML constructs, images, texts, and other objects such as interactive forms may be embedded in an HTML document.

HTML elements are delineated by tags, written using angle brackets. For example, tags such as <p> surround and provide information about document text. For the purpose of this disclosure, the data enrichment engine is operable to search such tags in an HTML document obtained from a web site corresponding to the abbreviated domain name and extract textual information from the HTML document using these tags. In some embodiments, the data enrichment engine may further process the textual information to remove irrelevant words such as conjunctions used to connect phrases, clauses, and sentences (e.g., such as, because, but, for, if, and, or, when, etc.). This process produces a text string that contains the textual content of the HTML document (110).

In some embodiments, the data enrichment engine is operable to obtain, from the textual content thus obtained, a set of words with initial characters that match characters of the abbreviated domain name to thereby establish a relationship between the set of words and the abbreviated domain name (115). In some embodiments, this process can include capturing a number of consecutive words from the textual content and comparing an initial character from each of the number of consecutive words with the characters of the abbreviated domain name. For example, suppose "aep-.com" is the seed domain and the textual content at "aep-.com" begins with "Need to pay your bill . . . ," the data enrichment engine is operable to capture "Need to pay" and compare the initial character from each of the number of consecutive words "Ntp" with the characters in the label of the abbreviated domain name "aep." The number of words captured for processing is determined based on the number of characters in an input abbreviated domain.

This process is iterated to find and extract sets of words that have their initial characters match the characters in the label of the abbreviated domain name. The relationship and order of words in the textual content are not changed or modified. Consecutive words having initial characters that match the characters in the label of the abbreviated domain name but that are arranged in an order that is different from that of the characters of the abbreviated domain name are not considered. The data enrichment engine is operable to count each occurrence of a set of words that have the same initial characters as the characters of the abbreviated domain name and that also match the order of those characters. In some embodiments, the set of words having the highest frequency of occurrences in the textual content can be selected as the candidate domain name. In some embodiments, sets of words that are determined by the data enrichment engine from the web content source code as having the same initial characters as the characters of the abbreviated domain name and also matching the order of those characters are added to an expanded keyword list associated with the abbreviated domain name.

In some embodiments, the relationship established by the data enrichment engine between the set of words and the abbreviated domain name can be recorded (125), for instance, in a data structure such as a database (e.g., candidate domains 430 shown in FIG. 4). This allows any domain name further discovered using the set of words as a candidate domain name to be associated with the abbreviated domain name. For instance, in some embodiments, the data enrichment engine is operable to ascertain whether the candidate domain name and the abbreviated domain name are owned by same entity by querying a WHOIS server (e.g., WHOIS server 450 shown in FIG. 4) with the set of words and comparing a result returned by the WHOIS server (e.g., from WHOIS database 460 shown in FIG. 4) with information associated with the entity (130). There can be many uses of the candidate domain name determined by the data enrichment engine. For example, responsive to the candidate domain name of the set of words and the abbreviated domain name being owned by same entity (135), keywords can be extracted from the candidate domain name and used to query the WHOIS server to find more new domain names. This process can be iterative as the new domain names, in turn, can be used to query WHOIS server for more potentially relevant domain names until no more new domain names could be found this way.

In some rare occasions, it is possible that no consecutive words in the web content source code have initial characters that actually match the characters of the abbreviated domain name (120). In such a case, method 100 may terminate or proceed to step 305 of method 300, as shown in FIG. 1. If a single set of consecutive words in the web content source code is determined by the data enrichment engine to have the initial characters that match the characters of the abbreviated domain name in the correct order, the single set of consecutive words can be considered as a candidate domain and used to find additional domain main names. The words themselves are added to the expanded keyword list associated with the abbreviated domain name. The expanded keyword list associated with the abbreviated domain name can be used by a domain name classifier, a domain filter (e.g., domain filter 440 shown in FIG. 4), or any suitable downstream computing facility (e.g., downstream computing facility 470 shown in FIG. 4) in the domain name discovery and protection system for domain risk analysis and detection associated with the abbreviated domain name.

As illustrated in FIG. 3, with the abbreviated domain name (301), the data enrichment engine can also query the WHOIS server about the abbreviated domain name (305) and use the domain name registration information for the abbreviated domain name to find more new domain names. As a non-limiting example, a portion of domain registration information containing key-value pairs is provided below.

```
{"standardRegCreatedDateOriginal": "2017-09-11 00:00:00 UTC",
"technicalContact_email": "", "registrant_telephone": "",
"billingContact_organization": "", "status": "addPeriod",
"whoisServer": "whois.nic.fr", "zoneContact_telephonesExt": "",
"nameServers": "", "administrativeContact_telephoneExt": "",
"billingContact_email": "", "registrarInfo": "1&1 Internet SE",
"registrant_state": "", "zoneContact_name": "",
"administrativeContact_postalCode": "", "zoneContact_state": "",
"billingContact_country": "", "billingContact_postalCode": "",
"zoneContact_organization": "", "registrant_email": "",
"registrant_rawText": "", "contactEmail": "",
"administrativeContact_country": "FRANCE", "updatedDateOriginal": "",
"technicalContact_telephone": "", "billingContact_telephone": "",
"Audit_auditUpdatedDate": "2017-09-12", "zoneContact_street2": "",
"standardRegUpdatedDateOriginal": "", "billingContact_rawText": "",
"registrarName": "", "zoneContact_telephone": "",
"zoneContact_country": "", "registrant_name": "",
"billingContact_faxExt": "", "registrant_telephoneExt": "",
"standardRegUpdatedDate": "","technicalContact_street1": "",
"technicalContact_fax": "", "zoneContact_street3": "",
"technicalContact_state": "", "expiresDateOriginal": "11/09/2018",
"technicalContact_postalCode": "", "WhoisRecord_rawText": "",
"registrant_country": "FRANCE", "registrant_faxExt": "",
"zoneContact_faxExt": "", "zoneContact_email": "",
"administrativeContact_email": "", "registrant_city": "",
"billingContact_telephoneExt": "","RegistryData_rawText": "%%|%% This
is the AFNIC Whois server.|%%|%% complete date format : DD/MM/YYYY|%%
short date format   : DD/MM|%% version       : FRNIC-2.5|%%|%%
Rights restricted by copyright.|%% See
https://www.afnic.fr/en/products-and-services/services/whois/whois-
special-notice/|%%|%% Use '-h' option to obtain more information about
this service.|%%|%% [213.87.240.199 REQUEST] >> startmynet.fr|%%|%% RL
Net [##########] - RL IP
[########.]|%%||domain:  domainname.fr|status:  ACTIVE ...",
...}
```

These key-value pairs can be parsed to find identifiers such as universal resource locators (URLs) that can indicate candidate domains. Additional details and examples of using domain name registration information associated with a domain name to find more new domain names can be found in U.S. patent application Ser. No. 15/986,585, filed on May 22, 2018, entitled "DOMAIN NAME PROCESSING SYSTEMS AND METHODS," which is incorporated by reference herein.

If the abbreviated domain name is not privately registered (310), a reverse lookup procedure can be performed (315) to iteratively query the WHOIS server for additional domain names registered to the same entity until no more brand-registered domain names could be found. In some embodiments, method 300 can be performed in conjunction with method 100 described above.

In some embodiments, the reverse lookup procedure can include obtaining, through a WHOIS server from a WHOIS database, WHOIS data for each domain name thus found. In some embodiments, as a non-limiting example, finding new domain names can entail comparing a registered WHOIS field value such as a registered email address from the WHOIS data for a known domain name and querying the WHOIS server for domain names having an email address that fully matches the registered email address. Other WHOIS field values may also be used. Additional details and examples of a suitable reverse lookup procedure can be found in U.S. patent application Ser. No. 16/244,955, filed on Jan. 10, 2019, entitled "SYSTEMS AND METHODS FOR DISCOVERY OF BRAND-REGISTERED DOMAIN NAMES," which is incorporated by reference herein.

For example, an abbreviated domain name "mlb.com" cannot be used directly to identify additional domains. However, performing a reverse lookup on "mlb.com" may return an email address "dnsadmin@mlb.com," This email address, in turn, can be used to identify domains registered using the same email address (e.g., major-league-baseball.com, majorleaguebaseball.sucks, majorleaguebaseball-world.com, majorleaguebaseball.net, wwwmajorleaguebaseball.com). Based on keywords extracted from these domains (e.g., "major," "league," "baseball"), the data enrichment engine can identify further suspicious/potential brand violation domain names as follows:

betmajorleaguebaseball.com
major-league-baseball.org
majorleaguebaseballbetting.us
majorleagebaseball.com As another example, an abbreviated domain name "aep.com" cannot be used directly to identify additional domains. However, from the web content of "aep.com," the data enrichment engine can obtain keyword terms "american," "electric," "power." Using these terms, the data enrichment engine can identify "americanelectricpower.com" as a candidate domain. Further, using these terms, the data enrichment engine can automatically identify "unamericanelectricpower.com" as a suspicious domain name.

FIG. 4 depicts a diagrammatic representation of network computing environment 400 where embodiments disclosed herein can be implemented. In this example, client device 401 can be communicatively connected to domain name discovery and protection system 410 over a network (e.g., a private intranet or a public network such as the Internet). Client device 401 may provide a domain name to domain name discovery and protection system 410 through a user interface (e.g., user interface 200) generated by interface module 445 of domain name discovery and protection system 410. Domain name discovery and protection system 410 may process the domain name provided by client device 401, recognize that the domain name is abbreviated, and direct data enrichment engine 420 to process the abbreviated domain name and obtain enriched, contextual information about the abbreviated domain name (e.g., relevant keywords with initial characters that match the characters of the abbreviated domain name and/or that can be used as a candidate domain to find even more relevant domain names).

Candidate domains found by the data enrichment engine can be segmented using an English keyword dictionary. This can be done using a natural language processing (NLP) library. For instance, following the above example in which "aep.com" represents an abbreviated domain name provided to the data enrichment engine, the data enrichment engine may determine, from the page source code associated with the abbreviated domain name, that a set of words "American electric power" is associated with the abbreviated domain name. Suppose "americanpowercompany.com" is a candidate domain found through the WHOIS server using the set of words "American electric power," the keyword set "American power company" is segmented from the candidate domain "americanpowercompany.com" and added to the expanded keyword list for use by a downstream computing facility. As discussed above, the candidate domain "americanpowercompany.com" can also be used to query the WHOIS server to determine whether the candidate domain "americanpowercompany.com" is owned by the same entity and/or find even more relevant domain names. Again, this process can be iterated until no more new domains could be found.

As discussed above, the data enrichment engine can find contextual information for an abbreviated domain name. This contextual information enables the data enrichment engine to establish a relationship between an abbreviated domain name and a candidate domain, enabling a downstream computing facility to perform a more streamlined, efficient processing. Due to the massive amounts of domain names (e.g., hundreds of millions daily) that may need to be processed, this data enrichment can significantly improve the performance of the overall system.

Figure 5:
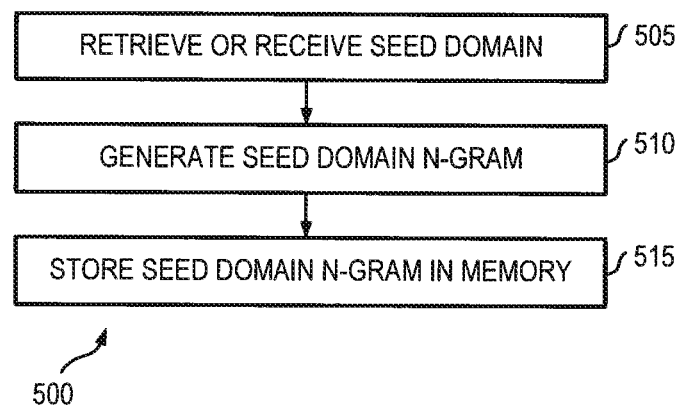
FIG. 5 is a flow chart illustrating a process for generating a seed domain n-gram according to some embodiments.
Figure 6:
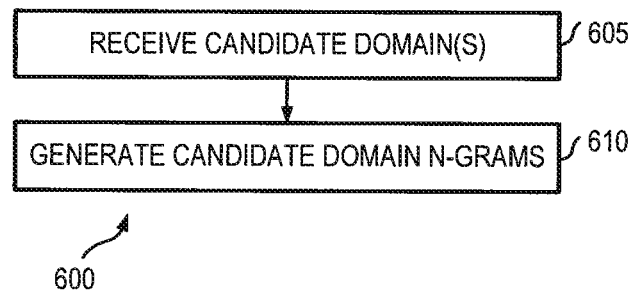
FIG. 6 is a flow chart illustrating a process for generating candidate domain n-grams according to some embodiments.
Figure 7:
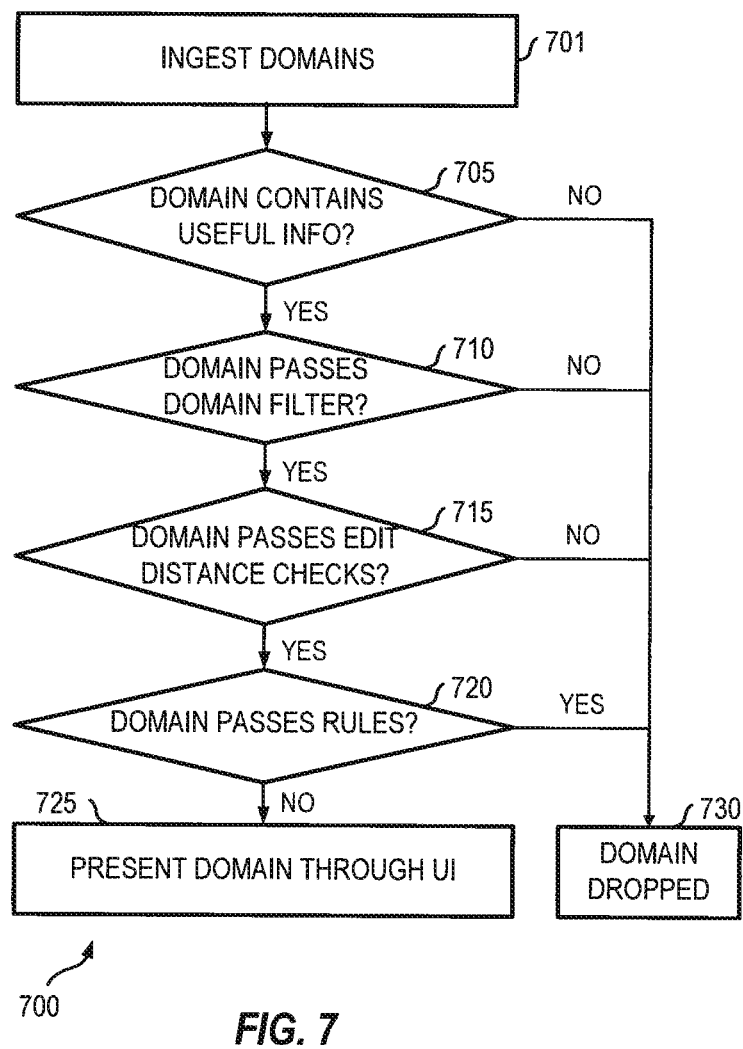
FIG. 7 is a flow chart illustrating an example of a domain name processing method according to some embodiments.

As an non-limiting example, FIGS. 5-7 describe how a domain filter (e.g., domain filter 440) can utilize the outcome provided by the data enrichment engine described above. For instance, for each seed domain, the domain filter is operable to filter down the number of candidate domains (including those provided by the data enrichment engine) that might be considered as similar or close based on a novel metric referred to herein as an "n-gram distance." For instance, the domain filter compares the n-gram of each candidate domain to the n-gram of the seed domain. However, rather than using the number of grams that match, the domain filter utilizes the number of grams left over in the n-gram of the seed domain from the matching. The number is the n-gram distance between the seed domain and a particular candidate domain. This n-gram distance is stored in a computer memory in association with the seed domain and the particular candidate domain. The domain filter can then perform an n-gram distance thresholding process by comparing n-gram distances thus determined with a predetermined threshold. Candidate domains that have an n-gram distance larger than the predetermined threshold are dropped or otherwise eliminated and only candidate domains that have an n-gram distance that matches the predetermined threshold or that is less than the predetermined threshold are provided to a downstream computing facility (e.g., downstream computing facility 470) and/or presented to a user through a UI generated by an interface module (e.g., interface module 445).

Referring to FIG. 5, the domain filter is operable to process, in a computer memory, a set of candidate domains against each seed domain retrieved or received for process (505). This processing can be referred to as a job (e.g., a scheduled processor job for processing a seed domain). In performing this job (e.g., job 500), the domain filter is operable to generate a n-gram for the seed domain (510) and store the n-gram thus generated in a computer memory (e.g., of a mobile device, a laptop computer, or a tablet computer) (515). Every time job 500 kicks off, an n-gram is created in the computer memory for a seed domain.

In the example of FIG. 6, job 600 may include retrieving or receiving a block or set of candidate domains (e.g., from the data enrichment engine, an Internet domain database, a data provider, etc.) (605) and generating an n-gram for each candidate domain thus retrieved or received for processing (610). In some embodiments, job 600 may take place concurrently with job 500, or job 500 may take place before job 600 so that n-grams for seed domains can be created and stored in the computer memory before job 600 is started.

FIG. 7 is a flow chart illustrating an example of a domain processing method 700 performed by the domain filter. Using an example of n-gram where n=2, the domain filter first breaks the seed domain into its bi-gram (through job 500) and stores the bi-gram in the computer memory. Then, per job 600, the domain filter also breaks the candidate domain into its bi-gram and store them in the computer memory. The domain filter then makes a copy of the bi-gram for the seed domain and stores the copy in the computer memory. In this way, the domain filter will not need to regenerate bi-gram for the seed domain each time it computes an n-gram distance between the seed domain and a candidate domain. Instead, each time a job is started, it makes a copy of the bi-gram for the seed domain and loads the copy of the bi-gram in the computer memory (701). The domain filter then uses the copy of the bi-gram to compute an n-gram distance between the seed domain and a candidate domain, as explained below More specifically, the domain filter takes a gram (also referred to as a word, e.g., (a,e)) of the seed domain (e.g., "aep.com") and compares that gram with all the grams of a candidate domain (705). This comparing step is repeated for each gram of the seed domain (e.g., compare (a,e) against all the grams in the bi-gram of the candidate domain, then compare (e,p) against all the grams in the bi-gram of the candidate domain, and so on).

Suppose the domain filter compares two bi-grams, one of the seed domain and another of the candidate domain, and determines that they share the same grams except for the first two. Grams that are exactly the same are removed, although duplicity is preserved (710). Duplicity may occur when there are two of the same grams in a bi-gram. Preserving duplicity means that any duplicate in the same bi-gram is not automatically deleted from the bi-gram. For example, if (o,o) shows up twice in a bi-gram of a seed domain and also shows up once in a bi-gram of a candidate domain, only one (o,o) is deleted from the bi-gram of the seed domain, thus preserving the duplicity of (o,o).

Once the bi-gram of the seed domain under processing has no gram identical to any gram in the bi-gram of the candidate domain, there can be zero or more grams left in the bi-gram of the seed domain in the computer memory. The n-gram distance can then be determined based on the number (zero or more) of grams left over when the seed domain is subtracted from the candidate domain under consideration (715). In this case, what is left is the difference between the seed domain and the candidate domain under consideration. Thus, the more grams are removed from the n-gram of a seed domain, the smaller the n-gram distance is between the seed domain and a candidate domain under consideration and the smaller the n-gram distance, the closer the distance between the two under comparison and the more related the candidate domain is to the seed domain, No normalization is needed to process the seed domain and the candidate domain and determine the n-distance between them. Further, the domain filter can preserve the order of grams in a bi-gram of a seed domain under processing. This can be done by forcing the removal of any identified shared/matching grams from the bi-gram of the seed domain only if they are in the correct order relative to the original seed domain bi-gram.

At runtime, the domain filter is operable to process all the candidate domains under consideration relative to the seed domain as described above (720). This process can be reiterated for each of a plurality of seed domains (725). Each n-gram distance is stored in the computer memory. When the n-gram distance between a seed domain and a candidate domain exceeds a predefined, predetermined, or preconfigured threshold, then the candidate domain is dropped from further processing or otherwise eliminated, e.g., from the computer memory (730). In some embodiments, when the n-gram distance between a seed domain and a candidate domain matches or is less than the threshold, then the candidate domain is kept. This is referred to as n-gram distance thresholding. The candidate domains that remain after the domain filter applied the n-gram distance thresholding can then be provided by the domain filter to a computing facility downstream from the domain filter. Examples of a downstream computing facility can include, but are not limited to, a user interface of a domain name discovery and protection system presented on a user device, an edit distance analyzer that computes edit distance or Levenshtein Distance to determine a degree of similarity between a seed domain and a filtered candidate domain, an analytical module running on a computer operating in an enterprise computing environment that is operable to analyze the seed domain and the filtered candidate domain, and so on. Additional details and examples of the domain filter can be found in the above-referenced U.S. patent application Ser. No. 15/986,585, which is incorporated by reference herein.

Figure 8:
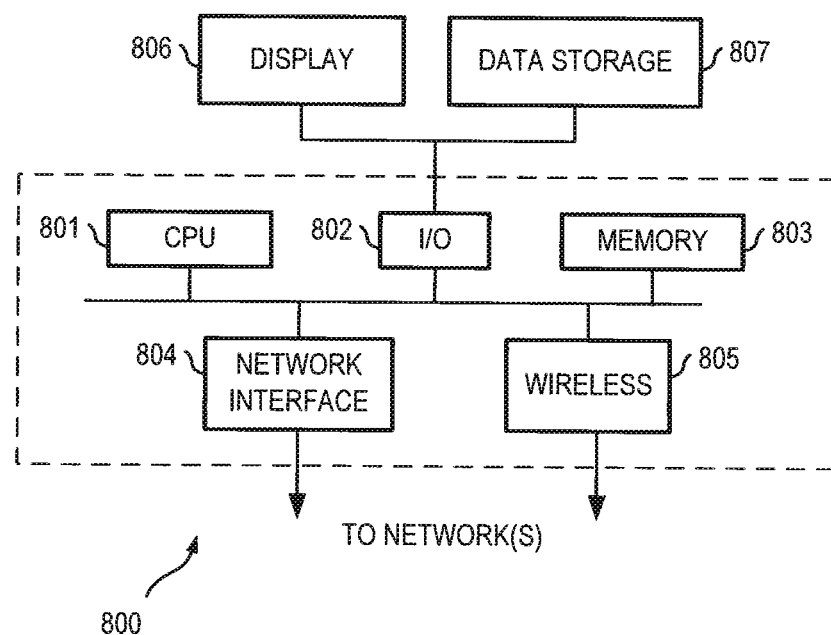
FIG. 8 depicts a diagrammatic representation of a data processing system for implementing a system according to some embodiments.

FIG. 8 depicts a diagrammatic representation of a data processing system for implementing a system for domain filtering. As shown in FIG. 8, data processing system 800 may include one or more central processing units (CPU) or processors 801 coupled to one or more user input/output (I/O) devices 802 and memory devices 803. Examples of I/O devices 802 may include, but are not limited to, keyboards, displays, monitors, touch screens, printers, electronic pointing devices such as mice, trackballs, styluses, touch pads, or the like. Examples of memory devices 803 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 800 can be coupled to display 806, information device 807 and various peripheral devices (not shown), such as printers, plotters, speakers, etc. through I/O devices 802. Data processing system 800 may also be coupled to external computers or other devices through network interface 804, wireless transceiver 805, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network.

Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method, comprising:
receiving, through a user interface by a computer operating a data enrichment engine, an abbreviated domain name;
obtaining, by the data enrichment engine, web content source code corresponding to the abbreviated domain name;
extracting, by the data enrichment engine, textual content from the web content source code corresponding to the abbreviated domain name;

determining, by the data enrichment engine from the textual content, a set of words with initial characters that match characters of the abbreviated domain name to thereby establish a relationship between the set of words and the abbreviated domain name;

recording, by the data enrichment engine, the relationship between the set of words and the abbreviated domain name;

determining, by the data enrichment engine, whether a candidate domain name of the set of words and the abbreviated domain name are owned by a same entity, the determining comprising querying a WHOIS server with the set of words and comparing a result returned by the WHOIS server with information associated with the entity;

responsive to the candidate domain name and abbreviated domain name being determined to be owned by the same entity, finding new domain names based on information relating to the candidate domain name; and providing, by the data enrichment engine, the candidate domain name to a downstream computing facility for domain name classification.

2. The method according to claim 1, wherein the characters of the abbreviated domain name comprise a letter, a number, a hyphen, or a combination thereof in one or more languages.

3. The method according to claim 1, wherein the determining the set of words comprises capturing a number of consecutive words from the textual content and comparing an initial character from each of the number of consecutive words with the characters of the abbreviated domain name.

4. The method according to claim 3, wherein the determining the set of words further comprises removing consecutive words from the textual content that have initial characters arranged in an order that is different from that of the characters of the abbreviated domain name.

5. The method according to claim 1, wherein the set of words with the initial characters that match the characters of the abbreviated domain name is selected, based on a frequency of occurrences in the textual content, from sets of words having same initial characters that match the characters of the abbreviated domain name.

6. The method according to claim 1, wherein finding new domain names based on information relating to the candidate domain name further comprises extracting keywords from the candidate domain name and querying the WHOIS server with the keywords extracted from the candidate domain name to find the new domain names.

7. The method according to claim 1, further comprising:
querying the WHOIS server with the abbreviated domain name;
determining whether domain name registration information for the abbreviated domain name is private;
responsive to the domain name registration information for the abbreviated domain name not being private, performing a reverse lookup procedure to iteratively query the WHOIS server for additional domain names registered to the same entity.

8. A system, comprising:
a processor;
a non-transitory computer-readable medium; and
stored instructions translatable by the processor for:
receiving, through a user interface, an abbreviated domain name;
obtaining web content source code corresponding to the abbreviated domain name;
extracting textual content from the web content source code corresponding to the abbreviated domain name;
determining, from the textual content, a set of words with initial characters that match characters of the abbreviated domain name to thereby establish a relationship between the set of words and the abbreviated domain name;
recording the relationship between the set of words and the abbreviated domain name;
determining whether a candidate domain name of the set of words and the abbreviated domain name are owned by a same entity, the determining comprising querying a WHOIS server with the set of words and comparing a result returned by the WHOIS server with information associated with the entity;
responsive to the candidate domain name and abbreviated domain name being determined to be owned by the same entity, finding new domain names based on information relating to the candidate domain name; and
providing the candidate domain name to a downstream computing facility for domain name classification.

9. The system of claim 8, wherein the characters of the abbreviated domain name comprise a letter, a number, a hyphen, or a combination thereof in one or more languages.

10. The system of claim 8, wherein the determining the set of words comprises capturing a number of consecutive words from the textual content and comparing an initial character from each of the number of consecutive words with the characters of the abbreviated domain name.

11. The system of claim 10, wherein the determining the set of words further comprises removing consecutive words from the textual content that have initial characters arranged in an order that is different from that of the characters of the abbreviated domain name.

12. The system of claim 8, wherein the set of words with the initial characters that match the characters of the abbreviated domain name is selected, based on a frequency of occurrences in the textual content, from sets of words having same initial characters that match the characters of the abbreviated domain name.

13. The system of claim 8, wherein finding new domain names based on information relating to the candidate domain name further comprises extracting keywords from the candidate domain name and querying the WHOIS server with the keywords extracted from the candidate domain name to find the new domain names.

14. The system of claim 8, wherein the stored instructions are further translatable by the processor for:
querying the WHOIS server with the abbreviated domain name;
determining whether domain name registration information for the abbreviated domain name is private;
responsive to the domain name registration information for the abbreviated domain name not being private, performing a reverse lookup procedure to iteratively query the WHOIS server for additional domain names registered to the same entity.

15. A computer program product comprising a non-transitory computer-readable medium storing instructions translatable by a processor for:
receiving, through a user interface, an abbreviated domain name;
obtaining web content source code corresponding to the abbreviated domain name;
extracting textual content from the web content source code corresponding to the abbreviated domain name;

determining, from the textual content, a set of words with initial characters that match characters of the abbreviated domain name to thereby establish a relationship between the set of words and the abbreviated domain name;

recording the relationship between the set of words and the abbreviated domain name;

determining whether a candidate domain name of the set of words and the abbreviated domain name are owned by a same entity, the determining comprising querying a WHOIS server with the set of words and comparing a result returned by the WHOIS server with information associated with the entity;

responsive to the candidate domain name and abbreviated domain name being determined to be owned by the same entity, finding new domain names based on information relating to the candidate domain name; and providing the candidate domain name to a downstream computing facility for domain name classification.

16. The computer program product of claim 15, wherein the determining the set of words comprises capturing a number of consecutive words from the textual content and comparing an initial character from each of the number of consecutive words with the characters of the abbreviated domain name.

17. The computer program product of claim 16, wherein the determining the set of words further comprises removing consecutive words from the textual content that have initial characters arranged in an order that is different from that of the characters of the abbreviated domain name.

18. The computer program product of claim 15, wherein the set of words with the initial characters that match the characters of the abbreviated domain name is selected, based on a frequency of occurrences in the textual content, from sets of words having same initial characters that match the characters of the abbreviated domain name.

19. The computer program product of claim 15, wherein finding new domain names based on information relating to the candidate domain name further comprises extracting keywords from the candidate domain name and querying the WHOIS server with the keywords extracted from the candidate domain name to find the new domain names.

20. The computer program product of claim 15, wherein the stored instructions are further translatable by the processor for:

queryng the WHOIS server with the abbreviated domain name;

determining whether domain name registration information for the abbreviated domain name is private;

responsive to the domain name registration information for the abbreviated domain name not being private, performing a reverse lookup procedure to iteratively query the WHOIS server for additional domain names registered to the same entity.

\* \* \* \* \*